United States Patent [19]

Kudo

[11] Patent Number: 4,514,777
[45] Date of Patent: Apr. 30, 1985

[54] DEVICE FOR CLEANING THE MAGNETIC HEAD OF A RECORDER/REPRODUCER APPARATUS FOR USE WITH A MAGNETIC TAPE CARTRIDGE OR THE LIKE

[75] Inventor: Tomio Kudo, Tokorozawa, Japan
[73] Assignee: Teac Corporation, Tokyo, Japan
[21] Appl. No.: 599,947
[22] Filed: Apr. 13, 1984
[30] Foreign Application Priority Data
May 9, 1983 [JP] Japan .................................. 58-68770
[51] Int. Cl.³ ............................................... G11B 5/41
[52] U.S. Cl. ...................................... 360/128; 360/137
[58] Field of Search ................. 360/128, 99, 137, 135, 360/97

[56] References Cited
U.S. PATENT DOCUMENTS

| | | | |
|---|---|---|---|
| 3,955,214 | 5/1976 | Post | 360/137 |
| 3,997,919 | 12/1976 | Thompson | 360/128 |
| 4,065,801 | 12/1977 | Leaming | 360/128 |
| 4,149,206 | 4/1979 | Loiselle | 360/137 |
| 4,158,871 | 6/1979 | Leaming | 360/137 |
| 4,272,796 | 6/1981 | Van Kreuningen | 360/128 |
| 4,442,468 | 4/1984 | d'Arc | 360/137 |

Primary Examiner—Robert M. Kilgore
Attorney, Agent, or Firm—Woodcock Washburn Kurtz Mackiewicz & Norris

[57] ABSTRACT

A device is disclosed for cleaning the magnetic head of a recorder/reproducer apparatus having a cartridge compartment into which a tape cartridge is slid for data transfer contact with the magnetic head. The head cleaner device has a casing of approximately the same shape and size as the tape cartridge, which casing is to be slid into and out of the cartridge compartment. The casing has pivotally mounted therein a handlebar having one end projecting therefrom through an aperture in the casing. Removably mounted to the other end of the handlebar, also exposed through another aperture in the casing, is a cleaner body of a plastic foam or like material which is to be pressed against the magnetic head upon full insertion of the cleaner casing in the cartridge compartment. The user may grip the projecting end of the handlebar and move the same back and forth about its pivot for cleaning the magnetic head by the cleaner body on the other end of the handlebar.

17 Claims, 7 Drawing Figures

DEVICE FOR CLEANING THE MAGNETIC HEAD OF A RECORDER/REPRODUCER APPARATUS FOR USE WITH A MAGNETIC TAPE CARTRIDGE OR THE LIKE

BACKGROUND OF THE INVENTION

My invention pertains to a device for cleaning the magnetic head of a recording and/or reproducing apparatus for use with magnetic tapes reelably packaged in interchangeable cartridges or the like.

Magnetic tapes are commercially available today in the form of various packages designed for the ease of handling. Examples are tape cartridges, cassettes, and magazines. Loaded in associated recorder/reproducer devices, the packaged tapes make direct contact with a magnetic head for easy recording and/or reproduction of information. It is essential for the proper performance of such recorder/reproducer devices that their magnetic heads be cleaned periodically.

The "cleaning cartridge" or "cleaning cassette" has been known and used extensively which houses a length of reeled cleaning tape in place of the usual magnetic tape and which can be loaded in the recorder/reproducer apparatus just like the standard cartridge or cassette itself. The cleaning tape cleans the magnetic head by being driven the same way as the magnetic tape. This kind of cleaning device is not quite so effective as it is expensive. It also does not lend itself to use with the tape cartridge apparatus of the type wherein the tape is frictionally rather than by the positive engagement of drive hubs with the tape reels. An example of such tape cartridge apparatus with a frictional tape transport arrangement is disclosed in Japanese Patent Publication No. 52-14976. Driven frictionally, the cleaning tape does not run so smoothly as when driven positively, with the consequent difficulties in cleaning the magnetic head.

SUMMARY OF THE INVENTION

My invention provides a head cleaner device of remarkably simplified construction which nevertheless can effectively clean the magnetic head in a tape recorder/reproducer apparatus of the type under consideration, regardless of the way employed for driving the magnetic tape.

The head cleaner device of my invention is generally intended for a recorder/reproducer apparatus of the type for use with a magnetic tape cartridge, with the apparatus having a cartridge compartment for receiving the tape cartridge, and a magnetic head adjacent the the cartridge compartment for data transfer contact with the magnetic tape of the tape cartridge. The head cleaner device comprises a casing adapted to be slid into and out of the cartridge compartment of the recorder/reproducer apparatus. Operatively mounted to the casing is a handlebar having one end projecting therefrom for manipulation by the user for moving another end thereof relative to the casing when this casing is received in the cartridge compartment. A cleaner body is mounted to the other end of the handlebar for direct contact with the magnetic head when the casing is received in the cartridge compartment.

Preferably the cleaner casing is in the shape of a flat box approximately equal in size and shape to the tape cartridge. The cleaner device can therefore be loaded in the recorder/reproducer apparatus just like the magnetic tape cartridge with which the apparatus is intended for use. The handlebar is pivotally mounted within the boxlike casing, with one end projecting therefrom for manipulation purposes and the other end exposed to carry the cleaner body. The user may pivotally turn the projecting end of the handlebar back and forth for cleaning the magnetic head by the cleaner body. Such manual operation affords a marked simplification in the construction of the cleaner device and enables the efficient cleaning of the magnetic head without being affected by the type of tape transport mechanism employed by the recorder/reproducer apparatus.

It is to be understood that the term "magnetic tape cartridge" as used in the foregoing summary and in the claims appended hereto is generic; I do not wish this term to be restricted to any particular type of packaged magnetic tape offered commercially or to the construction employed in the preferred embodiment disclosed herein. For, as will be better understood as the description proceeds, my invention is applicable to recorder/reproducer devices intended for use with various types of packaged tape including those commonly referred to as tape cassettes or tape magazines.

The above and other features and advantages of my invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

Figure 1:
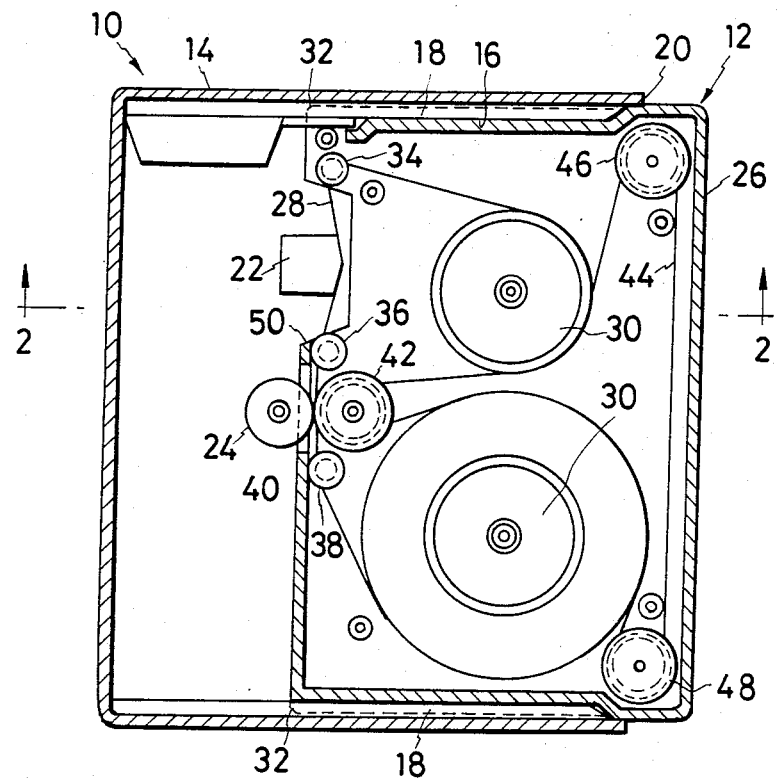
FIG. 1 is a section through an example of magnetic tape recorder/reproducer apparatus to which my invention finds application, the apparatus being shown together with an associated two reel magnetic tape cartridge loaded in position therein.
Figure 2:
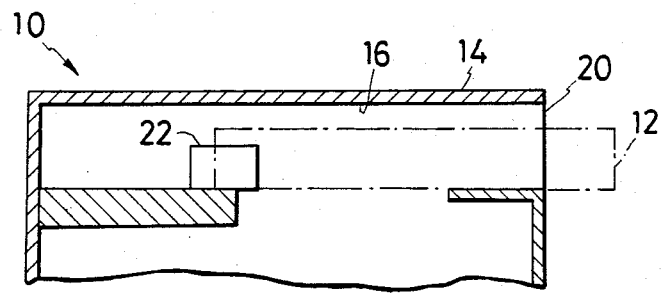
FIG. 2 is a fragmentary section through the tape recorder/reproducer apparatus of FIG. 1, taken along the line 2—2 therein and shown together with the tape cartridge in phantom outline.

I will now describe the head cleaner device of my invention as adapted for the magnetic tape recorder/reproducer apparatus shown in FIGS. 1 and 2 together with the two reel tape cartridge for use therewith. The illustrated recorder/reproducer apparatus and tape cartridge are per se conventional, being both disclosed in the aforementioned Japanese Patent Publication No. 52-14976. I will therefore describe their constructions and operations only insofar as is necessary for a full understanding of my present invention.

The exemplified recorder/reproducer apparatus is generally designated 10, and the associated tape cartridge 12, in FIGS. 1 and 2. The recoder/reproducer apparatus 10 has a housing 14 defining a cartridge compartment 16 for accommodating the tape cartridge 12. A pair of guide channels 18 extend along the opposite sides of the cartridge compartment 16 for guiding the movement of the tape cartridge into and out of the cartridge compartment. Arranged opposite the cartridge compartment 16, in a position farthest from the entrance end 20 of the cartridge compartment, is a magnetic transducer head 22 for data transfer with the tape cartridge 12. A drive capstan 24 is rotatably mounted adjacent the magnetic head 22 for driving the tape cartridge 12 in a manner detailed subsequently.

As shown also in FIG. 1, the magnetic tape cartridge 12 has a generally flat, boxlike envelope 26 housing a length of reelable magnetic tape 28 having its opposite ends anchored to a pair of reels 30. The envelope 26 has a pair of guide ribs 32 formed externally on its opposite sides for sliding engagement with the guide channels 18 of the recorder/reproducer apparatus 10 in moving the tape cartridge 12 into and out of the cartridge compartment 16. The guide ribs 32 extend at right angles with the axes of the tape reels 30.

Within the envelope 26 the magnetic tape 28 extend between the reels 30 via guide rolls 34, 36 and 38. The envelope 26 is apertured at 40 to allow the drive capstan 24 of the recorder/reproducer apparatus 10 to frictionally engage a pressure roller 42 rotatably mounted between the guide rollers 36 and 38 within the envelope 26. A drive belt 44 extends around the pressure roller 42 and two guide rollers 46 and 48. By being thus threaded over the three rollers 42, 46 and 48 the drive belt 44 makes frictional contact with the windings of the magnetic tape 28 on both reels 30. Thus, as the drive capstan 24 is rotated by a drive motor (not shown) contained in the recorder/reproducer apparatus 10, the consequent rotation of the pressure roller 42 causes the drive belt 44 to frictionally transports the magnetic tape 28 from one reel to the other.

The envelope 26 of the tape cartridge 12 is further apertured at 50 to expose that part of the magnetic tape 28 which extends between the guide rollers 34 and 36. Upon full insertion of the tape cartridge 12 in the cartridge compartment 16 the exposed part of the magnetic tape 28 come into data transfer contact with the magnetic head 22. Desired information is recorded on or reproduced from the magnetic tape 28 as the unshown drive motor is set into rotation to frictionally transport the tape via the drive belt 44.

Figure 3:
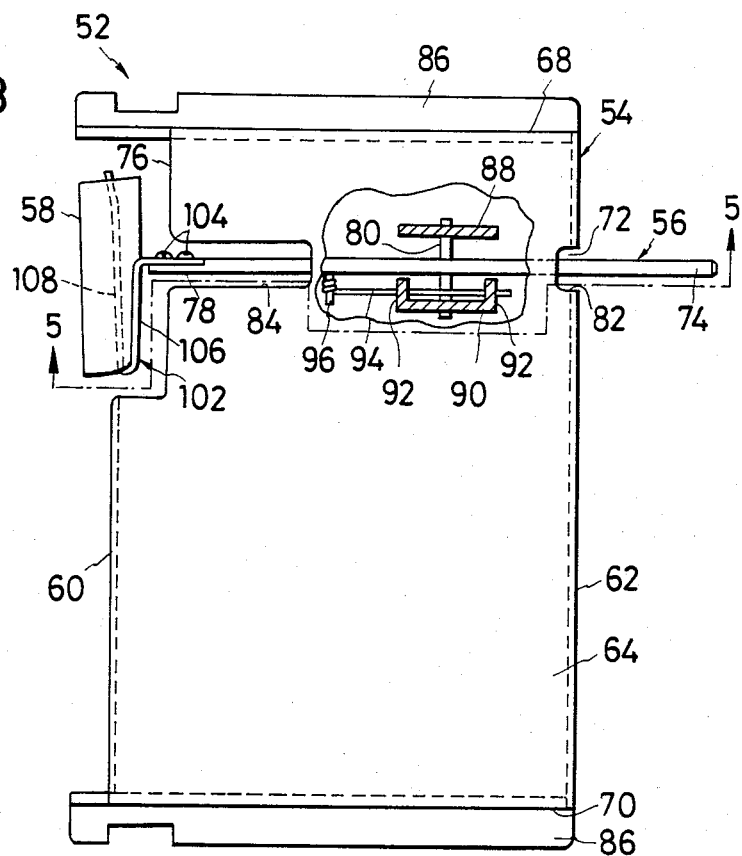
FIG. 3 is an elevation of the head cleaner device constructed in accordance with the novel concepts of my invention as adapted for use with the tape recorder/reproducer apparatus of FIGS. 1 and 2, the head cleaner device having its casing shown partly broken away to reveal the inner details.
Figure 4:
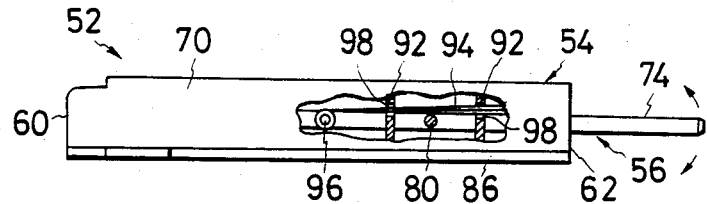
FIG. 4 is an edge elevation of the head cleaner device, as seen from the lower side of FIG. 3, the casing of the cleaner device being herein also shown broken away to reveal the inner details.
Figure 5:
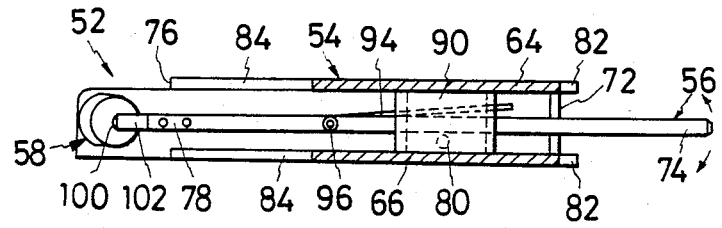
FIG. 5 is a section through the head cleaner device taken along the line 5—5 in FIG. 3.

I will now proceed to the description of the head cleaner device for use with the above recorder/reproducer apparatus 10. The construction of the head cleaner device will become apparent from a study of FIGS. 3, 4 and 5, and its operation from that of FIGS. 6 and 7. The reference numeral 52 in these figures generally denotes the head cleaner device itself. With reference to FIGS. 3 through 5 the head cleaner device 52 broadly comprises a casing 54, a straight handlebar 56 pivotally mounted within the casing, and a cleaner body 58 removably mounted to one end of the handlebar for cleaning the magnetic head. Both casing 54 and handlebar 56 are preferably metal made whereas the cleaner body 58 is of a plastic foam or like material.

The cleaner casing 54 is in the form of a relatively flat box approximately equal in shape and size to the tape cartridge 12. Thus the cleaner casing 54 comprises a front side 60 directed toward the left in FIGS. 3 through 5, a rear side 62 opposite the front side, a pair of opposed main sides 64 and 66 joining the front and rear sides in right angular relationship thereto, and another pair of opposed sides 68 and 70 joining the front, rear and main sides in right angular relationship thereto. The rear side 62 of the cleaner casing 54 has formed therein an aperture 72 through which the rear end 74 of the handlebar 56 projects rearwardly out of the casing. The front side 60 of the cleaner casing 54 is also apertured at 76 for exposing the front end 78 of the handlebar 56, to which the cleaner body 58 is attached by means yet to be described.

The handlebar 56 is supported by a pivot pin 80 fixedly mounted within the cleaner casing 54 and extending parallel to all of the front 60, rear 62 and main 64 and 66 sides of the casing. Thus, in cleaning the magnetic head 22 of the recorder/reproducer apparatus 10, the projecting rear end 74 of the handlebar 56 may be turned back and forth, as indicated by the arrows in FIGS. 4 and 5, for pivoting the handlebar about its pivot pin 80 and hence for swinging the cleaner body 58 in sliding engagement with the magnetic head. The direction in which the cleaner body 58 is so moved with respect to the magnetic head 22 is at right angles with the direction in which the tape 28 of the tape cartridge 12 travels past the magnetic head.

It is desirable that the angle of swing of the handlebar 56 be greater than is allowed by the apertures 72 and 76 in the front and rear sides of the cleaner casing 54. Toward this end the pair of main sides 64 and 66 of the cleaner casing have a pair of registered recesses 82 adjoining the rear side aperture 72, and another pair of registered recesses 84 adjoining the front side aperture 76. The two pairs of recesses 82 and 84 serve to enlarge the rear and front side apertures 72 and 76, respectively, in the direction in which the handlebar 56 is to be pivoted in cleaning the magnetic head.

The pair of opposite sides 68 and 70 of the cleaner casing 54 is formed to include a pair of guide ribs 86 extending longitudinally thereon. Similar in shape and size to the guide ribs 32 on the tape cartridge envelope 26, FIG. 1, these guide ribs 86 on the cleaner casing are adapted for sliding engagement with the guide channels 18 of the recorder/reproducer apparatus 10 when the head cleaner device 52 is loaded into and unloaded from the cartridge compartment 16.

The pivot pin 80 of the handlebar 56 has its opposite ends anchored to a pair of opposed support members 88 and 90 fixedly mounted between the pair of main sides 64 and 66 of the cleaner casing 54. While the support member 88 is shown as a flat plate, the other support member 90 is formed into the shape of a U in cross section, as in FIG. 3, providing a pair of opposed flange portions 92. These flange portions of the support member 90 are intended for engagement with a centering spring 94 in the form of a straight wire employed for normally holding the handlebar 56 in a central position relative to the cleaner casing 54, that is, parallel to and equidistantly spaced from the pair of main sides 64 and 66 of the cleaner casing. The centering spring 94 is connected between handlebar 56 and U shaped support member 90 as follows.

The handlebar 56 has a retainer pin 96 projecting laterally therefrom. The centering spring 94 has one end of its ends coiled on this retainer pin 96. The straight major portion of the centering spring 94 extends through holes 98 in the flange portions 92 of the support member 90. The handlebar 56 is to be manipulated against the force of this centering spring.

The cleaner body 58 is shown as a cylinder of a plastic foam, having a bore 100 extending axially therethrough, although it can be of other shape and of other material. Employed for removably mounting the cleaner body 58 to the handlebar 56 is a wire 102 or like member fastened at 104 to the front end of the handlebar. The wire 102 is bent to provide a first straight portion 106 of comparatively short extent arranged at right angles with the handlebar 56, and a second straight portion 108 of greater length extending in parallel spaced relation to the first straight portion. The spacing between these two straight portions 106 and 108 of the wire 102 is less than the radius of the cylindrical cleaner body 58. The cleaner body can therefore be readily mounted by receiving the second straight portion 108 of the wire 102 in its axial bore 100 since then part of the cleaner body is caught between the two straight wire portions 106 and 108 by virtue of its own elasticity. It will be appreciated that the replacement of the cleaner body 58 is no less easy.

OPERATION

Figure 6:
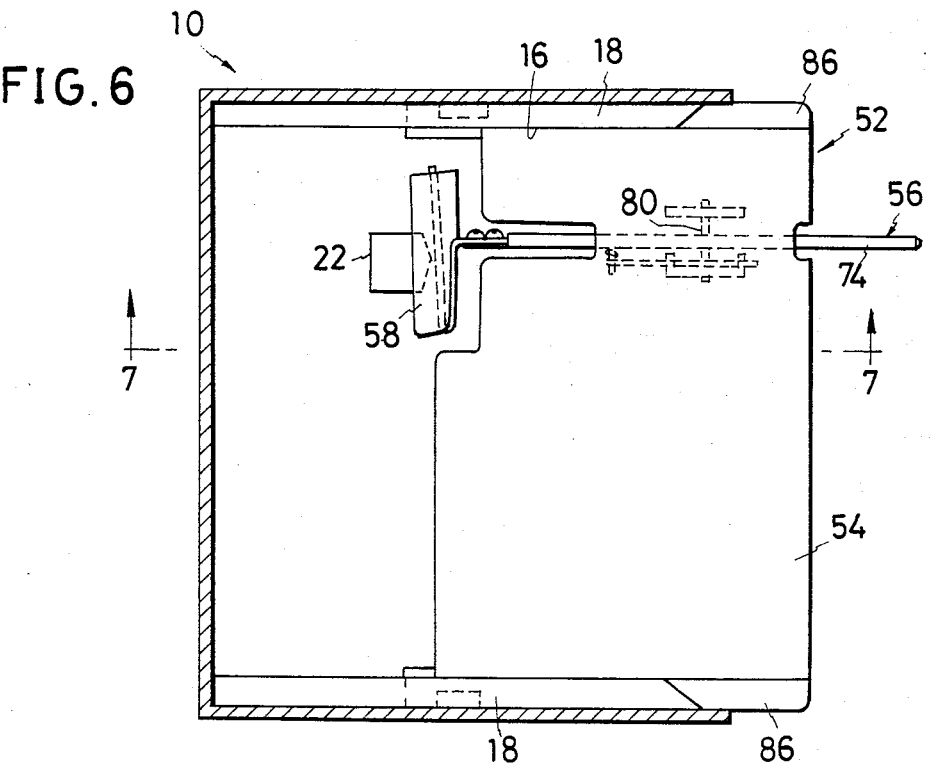
FIG. 6 shows in elevation the head cleaner device as loaded in the recorder/reproducer apparatus of FIGS. 1 and 2 by way of explanation of the operating method of the head cleaner device, the recorder/reproducer apparatus being shown in section for clarity.
Figure 7:
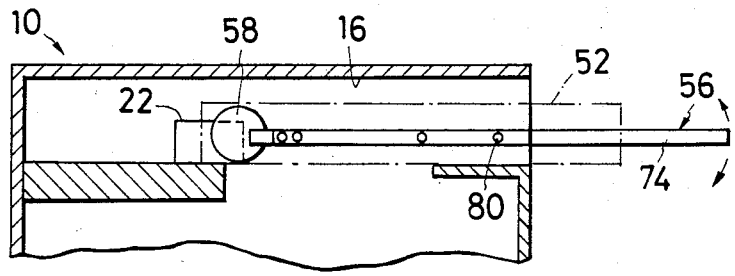
FIG. 7 is a fragmentary section through the head cleaner device and recorder/reproducer apparatus of FIG. 6, taken along the line 7—7 therein.

Reference is directed to FIGS. 6 and 7 for the operational description of the head cleaner device 52 in conjunction with the tape recorder/reproducer apparatus 10. For cleaning the magnetic head 22 of the recorder/reproducer apparatus 10 the head cleaner device 52 may be inserted in the cartridge compartment 16 of the apparatus. The head cleaner device 52 will be so loaded in the apparatus 10 just like the tape cartridge 12, with the pair of guide ribs 86 of the cleaner device sliding along the guide channels 18 of the apparatus 10, the casing 54 of the cleaner device being of substantially the same make as the envelope 26 of the cartridge.

The cleaner body 58 of the head cleaner device 52 will come into forced contact with the magnetic head 22 upon full insertion of the cleaner device in the cartridge compartment 16 as in FIGS. 6 and 7. The rear end 74 of the handlebar 56 will be left projecting out of the cartridge compartment 16, perhaps together with part of the cleaner casing 54, even upon full insertion of the cleaner device in the cartridge compartment. Then, as indicated by the arrows in FIG. 7, this projecting rear end of the handlebar 56 may be moved back and forth to cause the pivotal motion of the handlebar about the pivot pin 80. The cleaner body 58 on the front end of the handlebar 56 will then clear the magnetic head 22. As required, the cleaner body 58 may previously be impregnated with any head cleaning solution available commercially.

The exemplified head cleaning device 52 described in the foregoing offers the following advantages:

1. The head cleaning device 52 with its cartridgelike casing 54 is easy to load in the recorder/reproducer apparatus 10.

2. The magnetic head 22 is easily and throroughly cleaned by the simple manipulation of the handlebar 56, even though the head lies in the deepest part of the cartridge compartment which is not accessible by hand.

3. The cleaner body 58 is readily replaceable for effective cleaning of the head.

4. The handlebar 56 is swingable through a sufficiently great angle required for head cleaning, as the apertures 72 and 76 in the front and rear sides of the cleaner casing are enlarged by the recesses 82 and 84 in its main sides 64 and 66.

5. The great angle of swing of the handlebar 56 also facilitates the replacement of the cleaning body 58, as the handlebar can be held pivoted to either of its extreme positions for mounting or dismounting the cleaning body to or from its front end without interference by the sides 64, 66 and 68 of the cleaner casing 54.

6. The insertion of the cleaner device in the cartridge compartment of the recorder/reproducer apparatus is easy in spite of the great angle of swing of the handlebar 56, because the latter is normally held centered with respect to the cleaner casing 54 by the centering spring 94.

7. Fabricated of a plastic foam, the cleaner body 58 allows impregnation of a cleaning solution for the efficient cleaning of the magnetic head.

POSSIBLE MODIFICATIONS

Although I have shown and described my invention in terms of what I consider the most preferable embodiment thereof, I understand that my invention is not to be limited thereto but includes a variety of modifications or alterations that will readily occur to one skilled in the art on the basis of this disclosure. The following is a brief list of such possible modifications:

1. The cleaner body 58 may be firmly attached to the mounting member 102 or to an equivalent means, and this mounting means may be removably attached to the handlebar 56.

2. Not one but two springs may be employed for normally holding the handlebar 56 centered with respect to the cleaner casing 54, with the handlebar biased in opposite directions by the two springs.

3. The cleaner casing 54 need not be of the same shape and size as the tape cartridge 12 for use with the recorder/reproducer apparatus having the magnetic head to be cleaned, all that is required being that the cleaner device be readily movable into and out of the cartridge compartment of the recorder/reproducer apparatus.

4. The axis about which the handlebar 56 is pivoted need not be parallel to the pair of main sides 64 and 66 of the cleaner casing but to the other pair of opposite sides 68 and 70 at right angles therewith.

I claim:

1. A head cleaner device for a recorder/reproducer apparatus of the type for use with a magnetic tape cartridge, the apparatus having a housing defining a cartridge compartment for receiving the tape cartridge, and a magnetic head within the housing for data transducing contact with the magnetic tape of the tape cartridge, the head cleaner device comprising:

(a) a casing adapted to be slid into and out of the cartridge compartment of the recorder/reproducer apparatus;

(b) a handlebar operatively mounted to the casing and having one end projecting therefrom, the projecting end of the handlebar being capable of manipulation for moving another end thereof relative to the casing when the latter is received in the cartridge compartment; and (c) a cleaner body mounted to the other end of the handlebar for direct contact with the magnetic head when the casing is received in the cartridge compartment;

(d) whereby the magnetic head can be cleaned by the cleaner body as the handlebar is manipulated while the casing is inserted in the cartridge compartment;

(e) said casing being approximately equal in size and shape to the tape cartridge and having a front side, a rear side opposite the front side, and a pair of opposed main sides joining the front and rear sides in right angular relation thereto, the rear side of the casing having formed therein an aperture for allowing said one end of the handlebar to project out of the casing, the front side of the casing having formed therein another aperture for exposing said other end of the handlebar to which the cleaner body is mounted; and (f) said handlebar being mounted within the casing for pivotal motion about an axis parallel to all of the front, rear and main sides of the casing.

2. The head cleaner device of claim 1 wherein the pair of main sides of the casing are recessed to enlarge the apertures in the rear and front sides of the casing and hence to allow the handlebar to be pivoted through a greater angle.

3. The head cleaner device of claim 2 further comprising spring means for normally holding the handlebar approximately parallel to the pair of main sides of the casing.

4. The head cleaner device of claim 1 wherein the casing comprises an additional pair of opposite sides joining the front, rear and main sides of the casing in right angular relations thereto, the additional pair of opposite sides having guide means for use in sliding the head cleaner device into and out of the cartridge compartment of the recorder/reproducer apparatus.

5. The head cleaner device of claim 1 wherein the cleaner body is removably mounted to the handlebar for ready replacement.

6. The head cleaner device of claim 5 wherein the cleaner body is in the form of a cylinder of elastic material.

7. The head cleaner device of claim 5 wherein the cleaner body is fabricated of a plastic foam.

8. In combination with a recorder/reproducer apparatus for use with a magnetic tape cartridge having a length of magnetic tape reelably housed therein, the recorder/reproducer apparatus having a cartridge compartment for receiving the tape cartridge, guide means for guiding the tape cartridge into and out of the cartridge compartment in a direction at right angles with a reel axis of the tape cartridge, and a magnetic head for data transducing operation with the magnetic tape of the tape cartridge received in the cartridge compartment, a device for cleaning the magnetic head comprising:

(a) a casing slidable into and out of the cartridge compartment of the recorder/reproducer apparatus, the casing being approximately equal in size and shape to the tape cartridge and having opposed front and rear sides and opposed main sides joining the front and rear sides and two opposed apertures in its front and rear sides;

(b) a handlebar extending through the casing and medially supported for pivotal motion relative to the casing about an axis parallel to the front and rear sides and opposed main sides thereof, the handlebar having a rear end projecting out of the casing through the aperture in its rear side and front end exposed through the aperture in its front side, the projecting rear end of the handlebar being capable of manipulation for pivoting the same when the casing is received in the cartridge compartment; and (c) a cleaner body mounted to the front end of the handlebar for cleaning the magnetic head with the pivotal motion of the handlebar relative to the casing.

9. A head cleaner device for a recorder/reproducer apparatus of the type for use with a magnetic tape cartridge, the apparatus having a housing defining a cartridge compartment for receiving the tape cartridge, and a magnetic head within the housing for data transducing contact with the magnetic tape of the tape cartridge traveling therepast, the head cleaner device comprising:

(a) a casing adapted to be slid into and out of the cartridge compartment of the recorder/reproducer apparatus;

(b) a handlebar extending through the casing and medially supported for pivotal motion relative to the casing about a pivotal axis extending, when the casing is received in the cartridge compartment of the recorder/reproducer apparatus, substantially parallel to the direction in which the magnetic tape of the tape cartridge is to travel past the magnetic head, the handlebar having a first end projecting out of the casing for manually pivoting the handlebar relative to the casing; and (c) a cleaner body in the form of a cylinder replaceably mounted on a second end of the handlebar so as to extend parallel to the pivotal axis of the pivotal handlebar, the cleaner body coming into direct contact with the magnetic head of the recorder/reproducer apparatus when the casing is received in the cartridge compartment thereof;

(d) whereby the magnetic head can be cleaned by manipulating the first end of the handlebar to cause the bidirectional pivotal motion thereof relative to the casing while the latter is received in the cartridge compartment, and hence by causing the cleaner body on the second end of the handlebar to move back and forth in sliding engagement with the magnetic head in a direction at right angles with the direction of tape travel past the magnetic head.

10. The head cleaner device of claim 9 wherein the second end of the handlebar is bent to provide a first straight portion extending parallel to the pivotal axis of the handlebar, and a second straight portion extending in parallel spaced relationship to the first straight portion, and wherein the cleaner body is of elastic material and has a bore extending axially therethrough to receive the second straight portion of the second end of the handlebar, the spacing between the first and second straight portions of the second end of the handlebar being less than the radius of the cleaner body whereby the latter is caught between the first and second straight portions by virtue of its own elasticity.

11. The head cleaner device of claim 9 wherein the casing is in the shape of a box approximately equal in size and shape to the tape cartridge.

12. The head cleaner device of claim 11 wherein the casing has a front side, a rear side opposite the front side, and a pair of opposed main sides joining the front and rear sides in right angular relation thereto, the rear side of the casing having formed therein an aperture for allowing said first end of the handlebar to project out of the casing, the front side of the casing having formed therein another aperture for exposing said second end of the handlebar to which the cleaner body is mounted.

13. The head cleaner device of claim 12 wherein the pair of main sides of the casing are recessed to enlarge the apertures in the rear and front sides of the casing and hence to allow the handlebar to be pivoted through a greater angle.

14. The head cleaner device of claim 13 further comprising spring means for normally holding the handlebar approximately parallel to the pair of main sides of the casing.

15. The head cleaner device of claim 12 wherein the casing comprises an additional pair of opposite sides joining the front, rear and main sides of the casing in right angular relations thereto, the additional pair of opposite sides having guide means for use in sliding the head cleaner device into and out of the cartridge compartment of the recorder/reproducer apparatus.

16. The head cleaner device of claim 9 wherein the cleaner body is fabricated of a plastic foam.

17. In combination with a recorder/reproducer apparatus for use with a magnetic tape cartridge having a length of magnetic tape housed therein for transportation between a pair of reels, the recorder/reproducer apparatus having a cartridge compartment for receiving the tape cartridge, guide means for guiding the tape cartridge into and out of the cartridge compartment in a direction at right angles with the axes of the reels of the tape cartridge, and a magnetic head for data transducing operation with the magnetic tape of the tape cartridge received in the cartridge compartment, a device for cleaning the magnetic head comprising:

(a) a boxlike casing of approximately the same shape and size as the tape cartridge adapted to be slid into and out of the cartridge compartment of the recorder/reproducer apparatus as guided by the guide means thereof, the casing having a front side, a rear side opposite the front side, and a pair of opposed main sides joining the front and rear sides in right angular relation thereto, the front and rear sides of the casing having opposed apertures defined therein:

(b) a handlebar extending through the casing and medially supported for pivotal motion relative to the casing about a pivotal axis extending, when the casing is received in the cartridge compartment of the recorder/reproducer apparatus, substantially parallel to the direction in which the magnetic tape of the tape cartridge is to travel past the magnetic head, the handlebar having a rear end projecting out of the casing through the aperture in its rear side and a front end exposed through the aperture in its front side, the projecting rear end of the handlebar being adapted for manipulation for pivoting the handlebar relative to the casing;

(c) the pair of main sides of the casing being recessed to enlarge the apertures in the rear and front sides of the casing and hence to allow the handlebar to be pivoted through a greater angle;

(d) spring means for normally holding the handlebar approximately parallel to the pair of main sides of the casing; and (e) a cleaner body in the form of a cylinder replaceably mounted on the front end of the handlebar so as to extend parallel to the pivotal axis of the pivotal handlebar, the cleaner body coming into direct contact with the magnetic head of the recorder/reproducer apparatus when the casing is received in the cartridge compartment thereof;

(f) whereby the magnetic head can be cleaned by manipulating the projecting rear end of the handlebar to cause the bidirectional pivotal motion thereof relative to the casing while the latter is received in the cartridge compartment, and hence by causing the cleaner body on the front end of the handlebar to move back and forth in sliding engagement with the magnetic head in a direction at right angles with the direction of tape travel past the magnetic head.

* * * * *